United States Patent [19]

Roseliep

[11] Patent Number: 4,564,320
[45] Date of Patent: Jan. 14, 1986

[54] FORM BROACH ASSEMBLY

[76] Inventor: Robert E. Roseliep, 6 Elmsleigh La., Grosse Pointe, Mich. 48230

[21] Appl. No.: 575,498

[22] Filed: Jan. 23, 1984

[51] Int. Cl.[4] ............................................. B23P 15/42
[52] U.S. Cl. ........................................ 407/15; 407/17
[58] Field of Search ............... 407/15, 115, 116, 120, 407/17; 409/244

[56] References Cited

U.S. PATENT DOCUMENTS 3,512,235  5/1970  Fulks ..................................... 407/15
4,243,347  1/1981  Clapp et al. ........................... 407/15
4,294,568 10/1981  Lipowsky et al. .................... 409/244

FOREIGN PATENT DOCUMENTS 664315  1/1952  United Kingdom ................. 407/15

Primary Examiner—Leonidas Vlachos
Attorney, Agent, or Firm—Barnes, Kisselle, Raisch, Choate, Whittemore & Hulbert

[57] ABSTRACT

A form broaching assembly made up of a base block with an elongate recess to receive the root end of a series of broaching teeth, a plurality of hold-down blocks interengaged with the teeth, and wedge blocks acting on the hold-down blocks to insure an accurate alignment of the broaching teeth. The individual teeth may be manufactured with a true form relief as distinguished from a one-piece tool where this relief cannot be readily and successfully achieved.

2 Claims, 10 Drawing Figures

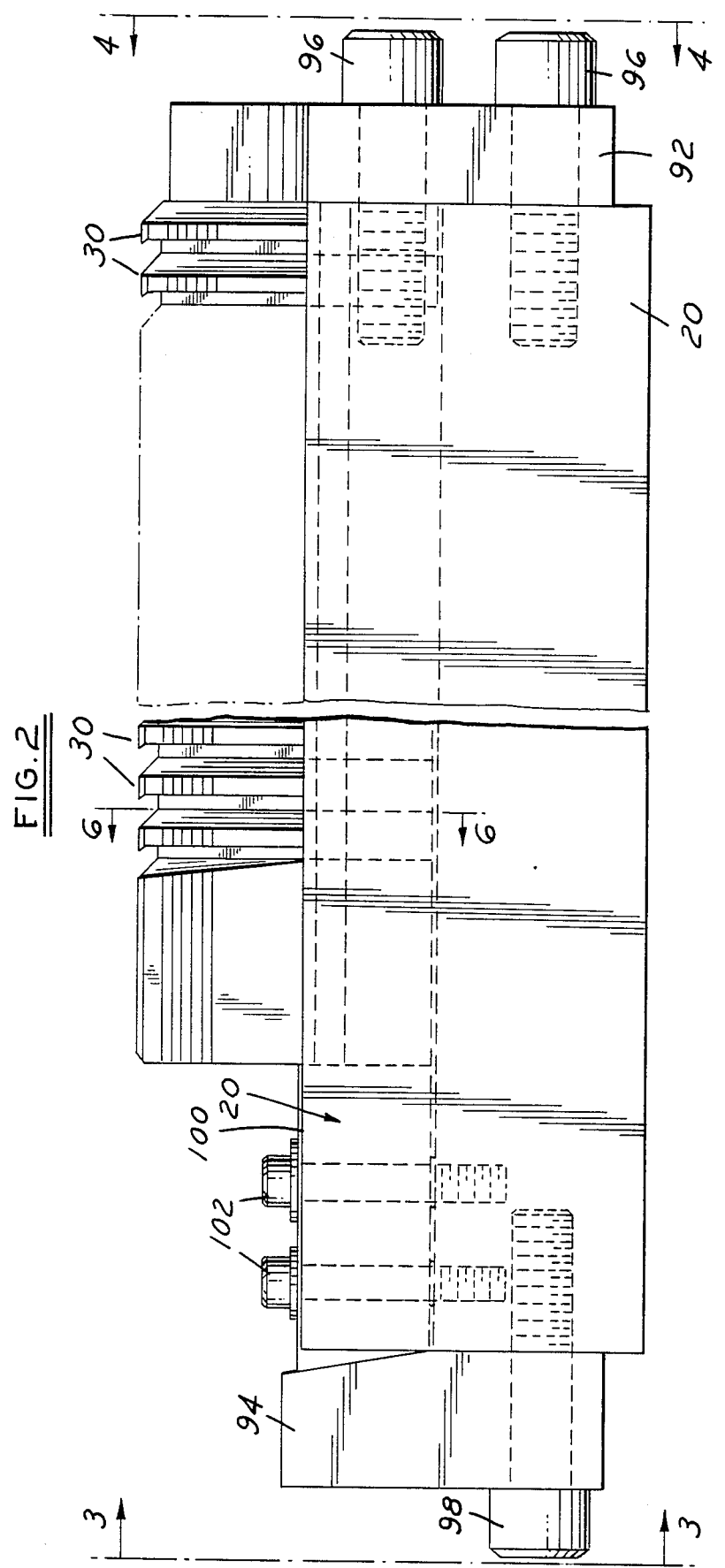

FORM BROACH ASSEMBLY

FIELD OF INVENTION

A tool assembly with multiple teeth for form broaching of metal parts.

BACKGROUND AND OBJECTS OF THE INVENTION

Form broaching and particularly slot broaching has been accomplished in the prior art with one-piece tooling in which individual teeth are ground into the tooling. Because of the limitations on the size of grinding wheels, it has been extremely difficult and costly to approximate the desired true form relief on the teeth of the tool.

The advantage of a broaching tooth with a true relief form all the way around the tooth is that the profile remains uniformly proportional when the cutter is sharpened. Furthermore, a smaller relief angle can be used due to the true form relief to allow more sharpenings before the size change exceeds part tolerances. The design also allows the use of carbide as a tool material for even greater tool life. This has not been possible in the one-piece design because of the difficulty in grinding carbide with the small grinding wheels necessary to grind the relief on one tooth without hitting the cutting edge of an adjacent tooth.

The individual cutters may each be made on computer numerical control (CNC) equipment to obtain the true form relief.

Another object and advantage of the invention lies in the tooth retaining assembly which provides accurate positioning and alignment of the individually ground teeth in a stepped hold-down block and wedge lock which cooperate to secure the teeth in a recessed holder.

Other objects and features of the invention will be apparent in the following description and claims in which the invention is described and details provided to enable persons skilled in the art to practice the invention, all in connection with the best mode presently contemplated.

BRIEF DESCRIPTION OF THE DRAWINGS

DRAWINGS accompany the disclosure and the various views thereof may be briefly described as:

FIG. 2, a side view of the assembly depicted in FIG. 1.

DETAILED DESCRIPTION OF THE INVENTION AND THE MANNER AND PROCESS OF USING IT

Figure 1:
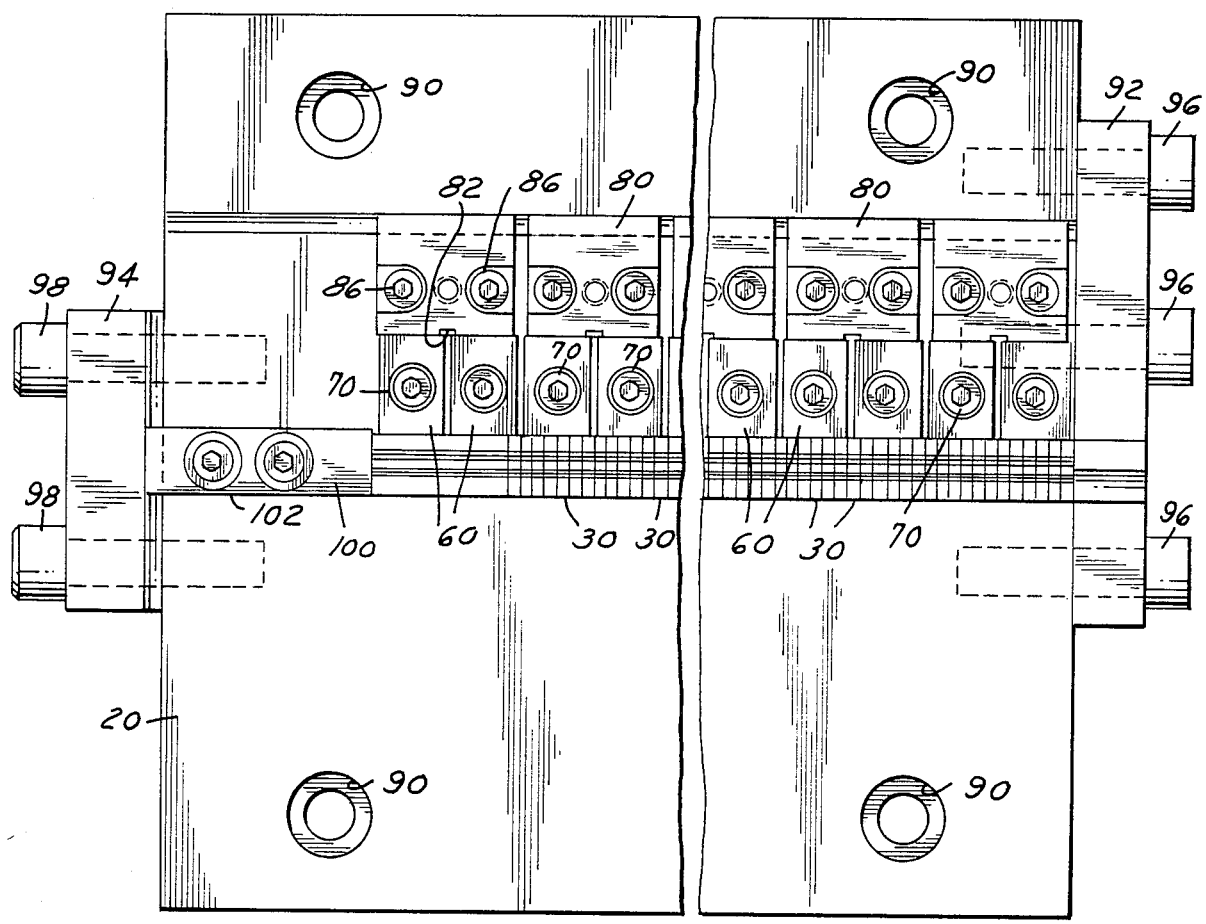
FIG. 1, a plan view of the tool assembly.

In FIG. 1, a plan view of the slot broach assembly shows a support base block 20 with a top recess 22 which carries a plurality of individual teeth 30 each having a cutting contour at the distal upwardly extending end and a root portion seated at one side of the recess 22 against a wall 32. The manner of securing the teeth will be later described.

Figure 3:
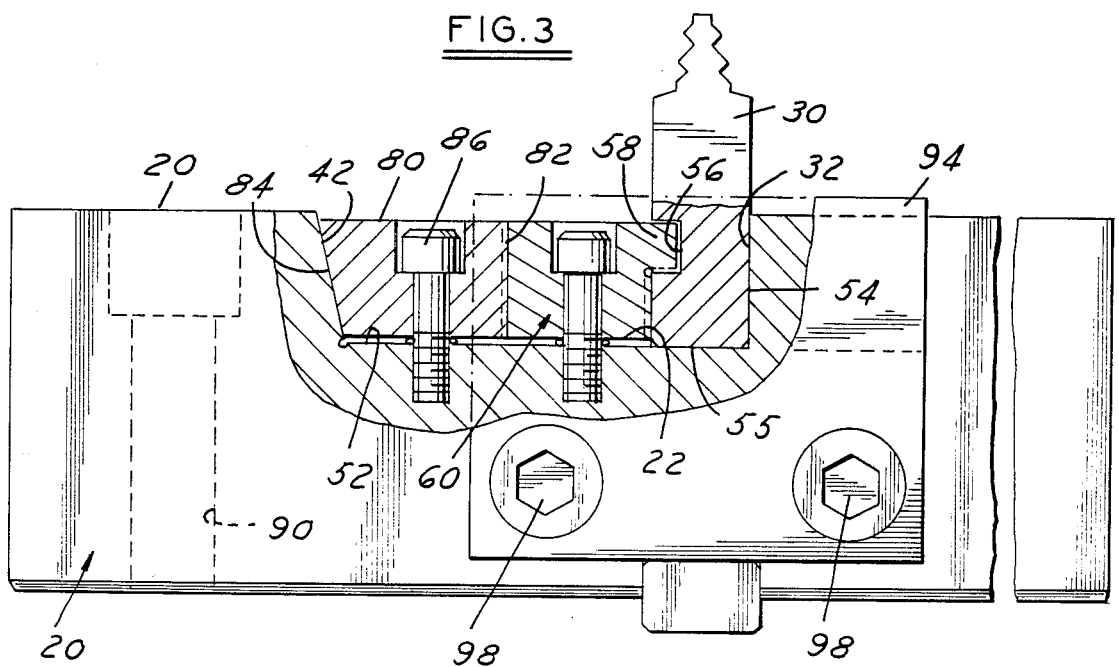
FIG. 3, an end view, partially in section, on line 3—3 of FIG. 2.
Figure 4:
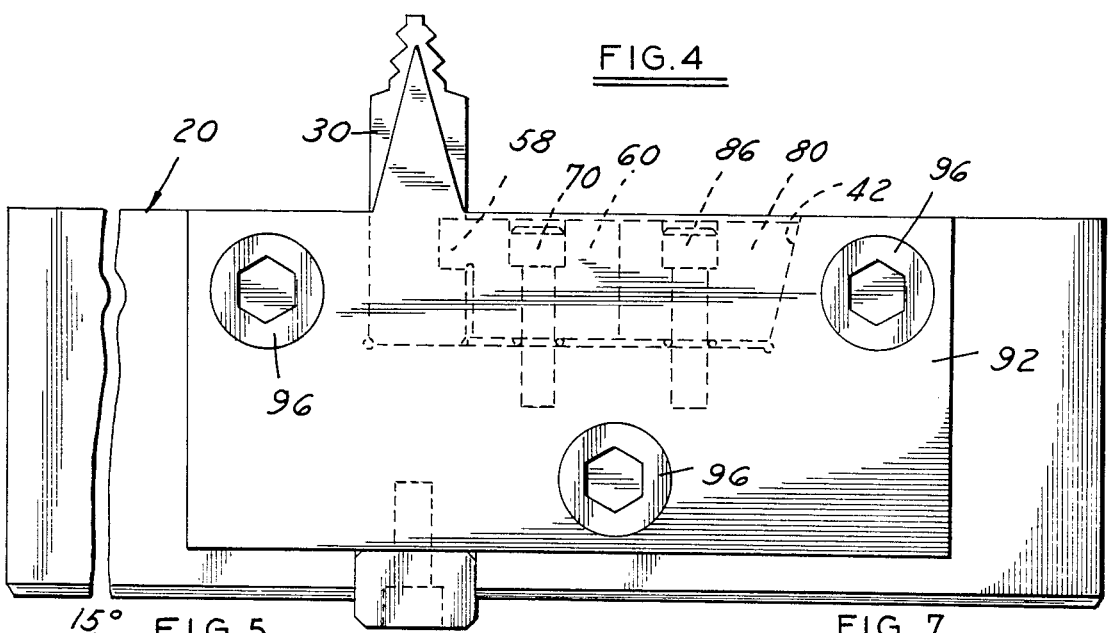
FIG. 4, an end view of the assembly taken on line 4—4 of FIG. 2.
Figure 5:
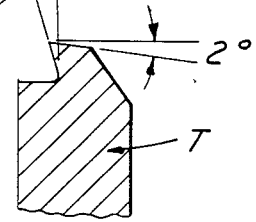
FIG. 5, an enlarged side view of a tooth partially in section showing the face angle and relief angle.

In broaching, it is necessary to have each following tooth cut progressively more of the work part than the leading teeth. However, a profile relief is necessary for each tooth. In FIGS. 3, 4 and 5, individual teeth are shown with one example of a profile for a slot. A side view of the teeth is found in FIG. 2. While the profile relief is not shown in FIG. 2, the horizontal lines on the cutting end will have, for example, a 2° back relief including the entire profile and radii in the profile.

In using the individual teeth, this back profile true form relief can be consistently formed into each tooth. In FIG. 5, a side view of a tooth illustrates, as an example, a 2° back relief angle which is provided for the entire profiled cutting portion of the tooth. Each tooth can be made on a computer numerical control machine. The radii and the profile are true form from the front to the back of the tooth. There is, for an example, a 15° face angle on the cutting profile and the properly profiled tooth can be sharpened on this lead face surface without distorting the profile for subsequent cutting. This design also allows the use of solid carbide as a tool material to provide even greater tool life. Grinding will ensmall the profile but leave it otherwise undistorted.

Figure 8:
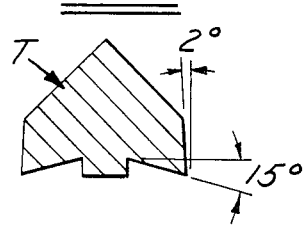
FIG. 8, a sectional view on line 8—8 of FIG. 7 showing the face angle.
Figure 7:
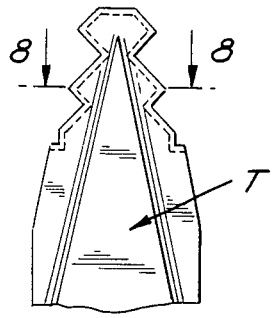
FIG. 7, an enlarged front view of a tooth illustrating the true form relief.

In FIG. 5, as has been described, the face angle of 15° at the top of the tooth has been described and also the form relief angle or back clearance of 2°, as an example. In FIG. 7, a frontal enlarged view of a tooth T is illustrated and form relief around the entire cutting form is illustrated in the dotted line just inside the profile line of the tooth. A small sectional view in FIG. 8 shows the 15° face angle extending inwardly from the profiled cutting edge. When the tooth is sharpened by grinding on the 15° face, the overall dimension of the tooth profile will be slightly altered but the profile will remain unaltered. An example of true form relief on a simple tool is found in my U.S. Pat. No. 4,401,401.

When a one-piece tool design is utilized, as in the prior art, with the profile ground longitudinally and each tooth relieved, one surface at a time, using a small grinding wheel because of the close spacing and a special grinding template, the object is to obtain a back clearance on the angular faces and corner radii. However, with this technique, it is impossible to obtain true form relief on all surfaces. The result is that when the tool is sharpened by grinding the face angle, the profile is altered from the originally designed profile.

It is, of course, essential that, in a broach with individual teeth, the teeth be perfectly aligned within the acceptable tolerances. In accordance with the present invention, this is accomplished by utilizing the base block 20 with the elongate recess 22 open at the top and having the vertical wall 32 along one side of the recess. Parallel with the vertical wall 22 is an angled wall 42. A flat base wall 52 lies between walls 32 and 42.

Figure 9:
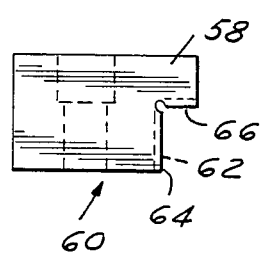
FIG. 9, a side elevation of a tooth hold-down block.
Figure 10:
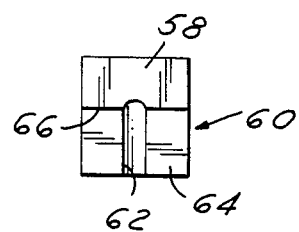
FIG. 10, an end view of the hold-down block depicted in FIG. 9.
Figure 6:
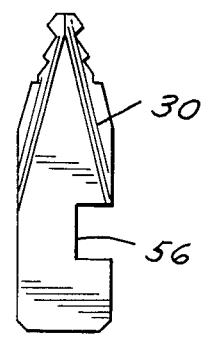
FIG. 6, a side elevation of an individual tooth taken on line 6—6 of FIG. 2.

As shown best in FIG. 3, the blades 30 have one straight base side 54, which may be termed a gauging side, lying flat against the wall 32. The bottom 55 of the tooth lying in contact with the flat base wall 52 also forms a gauging surface with respect to the height of the tooth. The opposite side of each blade base has a notch 56 to receive a side projection 58 on a hold-down clamp block 60. As shown in FIGS. 9 and 10, the block 60 has a groove 62 in the face 64 and the lower face 66 of the projection 58. The purpose of this groove 62 is to insure positive seating on the surfaces 64 and 66 of adjacent blades since each holder block is designed to span two adjacent blades. The notch 56 in the blade and the projections 58 will be dimensioned to insure tight positioning.

Recessed holes 68 are provided in each hold-down block 60 to receive standard socket head screws 70 threaded in to the base holder block.

Again, with reference to FIG. 3, a wedge block 80 is shown in cross-section. These blocks have a width to span two of the hold-down blocks 60 (FIG. 1) and likewise have a central face groove 82 to insure positive seating on each hold-down block 60 contacted. These wedge blocks have an angled face 84 (FIG. 3) to cooperate with an angled face 42 in the base holder block. The angle of these faces is preferably about 10°.

Two recessed holes are provided in blocks 80 to receive socket head screws 86 threaded into base block 20. A slight clearance is provided in the screw holes in the blocks 60 and 80 to allow some shifting toward the wall 32 in the base block 20.

Thus, as viewed in the plan view of FIG. 1, each adjacent pair of broach cutter teeth 30 is backed by and clamped down by a hold-down block 60. Each pair of blocks 60 is backed by a wedge block 80. In assembly, the cutters are seated on the base wall 52 and aligned against wall 32 in base block 20 in conjunction with the hold-down blocks 60. The screws 70 are partially tightened. Wedge blocks 80 are placed behind each pair of blocks 60 and screws 86 tightened to move the blocks 60 against the cutters and the cutters into tight contact with the vertical wall 32 and the base wall 52. The screws 70 are then finally tightened. This assures that the cutters 30 are properly aligned in the base block 20.

The base block 20 has recessed holes 90 to serve in clamping the base block in an appropriate broaching position. As shown in FIGS. 1, 2 and 4, the ends of the broaching tooth slot are closed respectively by plates 92 and 94 secuted to the base block 20 by bolts 96 and 98 respectively. An end filler plate 100 is wedged into the teeth endwise by end plate 94, as shown best in FIG. 2, to pack the cutter teeth in close array before final clamping. A pair of screws 102 hold filler plate 100 in position.

It will be appreciated that each tooth or series of teeth will have progressively differing dimensions so that, for an example, a slot being broached will be gradually enlarged to the desired dimension. However, with each tooth being individually ground with a true form relief, the slot can be broached accurately with chip relief where needed. Any particular tooth can be removed and replaced if need be and all teeth may be reground for sharpening. With the forming of true relief angles, smaller relief angles may be used and this will allow more sharpenings before the size change exceeds part tolerance.

What is claimed is:
1. A slot broaching tool comprising:
(a) a base having means forming an elongate recess having a bottom and a locating wall to receive a plurality of individual broaching teeth in close array,
(b) a plurality of individual broaching teeth in alignment in said recess, each tooth having a cutting end ground to a true form relief,
(c) means to retain said teeth in accurate alignment in said recess against said locating wall,
(d) said means to retain said teeth in accurate alignment in said recess comprising block means to interengage each tooth and force said tooth down to said bottom of said recess and against said locating wall,
(e) each tooth being formed with a base end and a cutting end, said base end having a gauging side to lie in contact with said locating wall of said recess and said base end having a locking side opposite to said gauging side, and said block means comprising a first hold-down block to interengage the locking side of each tooth and a second wedge block to contact the first block and a wall of said recess opposite said locating wall to exert lateral holding force against said locating wall.

2. A broaching tool as defined in claim 1 in which said hold-down block lies in contact with the locking side of at least two adjacent teeth, and said wedge block lies in contact with at least two of said hold-down blocks.

* * * * *